United States Patent [19]
Brezny

[11] Patent Number: 6,051,529
[45] Date of Patent: Apr. 18, 2000

[54] CERIC OXIDE WASHCOAT

[75] Inventor: Rasto Brezny, Catonsville, Md.

[73] Assignee: W. R. Grace & Co.-Conn., New York, N.Y.

[21] Appl. No.: 09/208,798

[22] Filed: Dec. 10, 1998

[51] Int. Cl.$^7$ .............................. B01J 8/00; B01J 23/00; C01F 17/00
[52] U.S. Cl. .................. 502/302; 423/239.1; 423/263; 502/303; 502/304; 502/308
[58] Field of Search ................... 423/239.1, 263; 502/302, 303, 304, 308

[56] References Cited

U.S. PATENT DOCUMENTS

| | | | |
|---|---|---|---|
| 2,900,244 | 8/1959 | Bradstreet et al. | 75/0.5 |
| 4,621,071 | 11/1986 | Blanchard et al. | 502/302 |
| 4,927,799 | 5/1990 | Matusumoto et al. | 502/303 |
| 5,130,109 | 7/1992 | Wan | 423/213.2 |
| 5,167,885 | 12/1992 | Rice et al. | 264/56 |
| 5,762,894 | 6/1998 | Takatori et al. | 423/263 |
| 5,786,031 | 7/1998 | Retallick et al. | 427/376.4 |
| 5,795,456 | 8/1998 | Friedman et al. | 204/471 |

*Primary Examiner*—Steven P. Griffin
*Assistant Examiner*—Cam N. Nguyen
*Attorney, Agent, or Firm*—Beverly J. Artale

[57] ABSTRACT

A powder composition of ceric oxide and a stabilizing non-noble metal oxide, such as zirconium oxide, mixed at the atomic level in complete solid solution. The powder is used to form washcoats for catalytic converters. The composition has high oxygen storage capacity and maintains an ultrafine crystallite size at high temperatures. The powder is formed by a spray pyrolysis process that includes atomizing a clear solution of cerium ions and ions of the non-noble metal into a fine mist that is passed rapidly through a furnace to form powder particles.

9 Claims, No Drawings

CERIC OXIDE WASHCOAT

BACKGROUND OF THE INVENTION

1. Field of the Invention

The present invention relates to the preparation of powders of mixed, non-noble metal oxides, having high oxygen storage capacity, to be used, for example, in exhaust-purifying catalytic washcoats for internal combustion engines.

2. Description of the Related Art

Ceric oxide has been stabilized with other, non-noble metal oxides to be used as a catalyst and a catalyst support (washcoat). The washcoat generally is coated onto a base, often made of ceramic or metal, and a noble metal is deposited on the washcoat.

A typical application is catalytic converters for treating the exhaust gases produced by internal combustion engines. A noble metal catalyst, such as platinum, is deposited on the non-noble metal oxide washcoat and supported on a framework within the converter. Catalytic conversion of the component by-products from the engine's exhaust gases are oxidized as the gases pass over the solid catalysts. See U.S. Pat. No. 3,993,572, to Hindin et al., for example.

Various factors influence catalytic activity. For example, the effectiveness of a solid catalyst generally increases with increased surface areas exposed to the material to be treated. Accordingly, maintaining particles of a solid catalyst in a highly divided state provides greater surface area, resulting in a more effective catalyst.

When a catalyst structure consists of a mixture of various catalytic components, such as ceria and zirconia, it follows that a more intimate mixture of the components will result in a more effective catalyst structure The oxygen storage capacity of the washcoat in a catalytic converter is also of great importance, because the catalyst utilizes oxygen in order to oxidize components of the engine exhaust.

Various examples of catalyst structures are known. An alumina-based, catalyst carrier material formed by coprecipitation is disclosed in U.S. Pat. No. 4,331,565 to Schaefer et al. U.S. Pat. No. 4,940,685 to Sauvion et al. discloses a particulate, ceric oxide catalyst composition. The ceric oxide particulates are porous and have another metallic oxide dispersed therein. The composition is formed by coprecipitation, and does not provide the complete, solid solution of the present invention.

A composite powder, containing a catalytically-active noble metal and a promoter, is disclosed in U.S. Pat. No. 4,910,180 to Berndt et al. The agglomerated composite powder is formed by a spray pyrolysis process and subsequently is ball-milled to improve exposure of the noble metal.

The catalyst materials obtained by the known processes do not provide a catalyst washcoat made up of a complete solid solution of oxides of non-noble metal oxides having high oxygen storage capacity as provided by the present invention.

SUMMARY OF THE INVENTION

In order to overcome the deficiencies of the catalyst structures noted above, the present invention provides a process for preparing a powder made up of cerium oxide and at least one other non-noble metal oxide. Advantageously, the oxides are mixed at the atomic level, forming a complete, solid solution.

The process of the present invention includes the steps of producing a fine mist of a salt solution made up of cerium ions and ions of at least one, non-noble metal. The fine mist is dried by spray pyrolysis to form particles of cerium ions and the ions of at least one non-noble metal: mixed on the atomic level. The salts of the particles formed decompose to their oxides, thus forming particles of cerium oxide and the non-noble metal oxide mixed and in complete solid solution. Preferably, the non-noble metal oxide component is zirconium oxide.

The present invention also provides a composition for promoting oxidation formed by the process above. The composition obtained has a cubic structure, without the use of other stabilizing oxides.

The composition and process of the present invention provide a catalyst support having a high oxygen storage capacity. Advantageously, the process of the present invention takes place at lower temperatures than previously known processes. Accordingly, the powders produced by the process of the present invention have a decreased loss in surface area of the powders, compared to powders produced by earlier processes.

DETAILED DESCRIPTION OF THE INVENTION

The process for preparing a powder of cerium oxide and at least one other non-noble metal oxide in solid solution includes making a homogeneous, aqueous solution of a cerium salt and at least one non-noble metal salt. A fine mist of the solution is formed, and the fine mist is dried by heating at a temperature of from about 500° C. to about 1000° C. Drying takes place for about 0.5 seconds to about 20 seconds, whereby particles are formed of the cerium salt and the at least one non-noble metal salt mixed on the atomic level. The salts of the particles decompose, forming particles of the cerium oxide and the at least one non-noble metal oxide mixed at the atomic level and in complete solid solution.

Suitable, non-noble metal oxides include, without limitation, transition metal oxides, rare earth metal oxides, and combinations thereof. Preferably, the non-noble metal oxide component includes zirconia, yttria, lanthanide, actinide, and combinations thereof. Most preferably it is zirconia (zirconium oxide).

The salts utilized herein include any aqueous soluble salts of the non-noble metals, such as nitrates, sulfates, chlorides, and acetates. The acetates are preferred herein.

The homogeneous, aqueous solution preferably is formed so as to obtain final concentrations in the solid solution powder in the range of about 7 to about 80 wt % non-noble metal oxide, preferably about 25 to about 42 wt %. The most preferred composition of stabilized ceria is about 42 wt % $ZrO_2$ and about 58 wt % $CeO_2$.

The aqueous solution is atomized into a mist of fine droplets, about 10 $\mu$ to about 200 $\mu$ in diameter, preferably about 25 $\mu$ to about 100 $\mu$, most preferably about 25 $\mu$ to about 50 $\mu$. The fine mist is passed through a furnace operating at a temperature sufficient to decompose the metal salt to the corresponding oxide, for example, about 300° C. to about 1,200° C., preferably about 500° C. to about 1000° C., most preferably about 750° C. to about 1,000° C.

Residence time in the furnace is from about 0.5 seconds to about 20 seconds, preferably from about 0.7 secs. to about 11 secs., most preferably about 0.7 secs. to about 6 secs. This rapid, high temperature process commonly is known as spray pyrolysis.

The powders produced by the method above are made up of particles, when freshly made, having a surface area of about 60 m²/g. The particles have a crystallite size of about 25 Å to about 150 Å, with an average crystallite size of about 32 Å. The oxygen storage capacity of the particles, up to about 700° C., is about 200 μmol/g to about 600 μmol/g, with an average of about 510 μmol/g. The oxygen storage capacity of the particles, up to about 1000° C., is about 500 μmol/g to about 1200 μmol/g., with an average of about 1040 μmol/g.

After aging at up to about 1,000° C. for five hours, the particles have a surface area of about 1 m²/g to about 50 m²/g, and a crystallite size of about 25 Å to about 400 Å. The average surface area is about 5 m²/g, and the crystallite size is about 76 Å. The aged particles have an oxygen storage capacity, up to about 700° C., of about 300 μmol/g to about 500 μmol/g., with an average of about 400 μmol/g, and an oxygen storage capacity up to about 1000° C. of about 500 μmol/g to about 1200 μmol/g, average about 670 μmol/g.

Other features and advantages of the present invention will become more apparent from the following, non-limiting examples:

EXAMPLE

The process of the present invention was utilized to prepare a ceric oxide washcoat as follows: Cerium carbonate powder was dissolved in dilute acetic acid to make an aqueous solution of cerium acetate. The aqueous cerium acetate solution was added to an aqueous solution of zirconyl acetate to form a homogeneous, aqueous solution of ceria and zirconia ions.

The homogeneous, aqueous solution was atomized using a two-fluid nozzle into a fine mist of droplets 10 μ to 100 μ in diameter. The micronized droplets were carried into a tube furnace using a flow of air. A slight vacuum of about 2" H₂O was applied to the tube to carry the mist through the furnace. The fine mist was heated in the furnace at a temperature of about 1,000° C. Residence time within the furnace was 0.7 seconds. As the droplets dried, a powder of zirconium acetate and cerium acetate mixed on the atomic level was formed.

The acetates decomposed to form oxides of zirconium and cerium atomically mixed and in complete solid solution. The powders obtained were 42 wt % zirconium oxide and 58 wt % cerium oxide, and had a surface area of 3, after calcination at 1,000° C. for 5 hours.

Comparative Example

The powders formed according to the method above were compared with similar materials made using a known, two-step process. The acetate solution of zirconium and cerium was spray-dried, followed by a separate, tray calcination step. Aqueous salt solutions were prepared in a manner similar to that of the Example above. The solutions were spray dried using a two-fluid nozzle at a temperature of 180° C. The spray-dried material was calcined in a tray for 60 mins. at a temperature of 600° C.

Although the tray-calcined material produced a solid solution, the material produced had a significantly lower oxygen storage capacity than the same composition made according to the method of the present invention.

Oxygen Storage Capacity

The oxygen storage capacity (OSC) of the powders was compared using a temperature programmed reduction (TPR) analysis, as follows:

100% argon was flowed at 750° C. over prepared samples of 0.1 g for one hour as an outgas step.

The samples were cooled to 300° C.

The temperature of the samples was raised linearly at 20° C./min., while flowing 5% H₂/Ar over the samples.

Water produced by reduction was trapped in Pyrex U-tubes packed with mole sieve.

The consumption of hydrogen was measured by the difference in the thermal capacity of the incoming and exiting gas.

The area under the profile was compared to the area under the calibration spikes of 100% argon.

The results of the comparison are shown in the Table below, where the Comparative Sample was made using the comparative example process above, and Samples 1 and 2 were made using the method of the present invention. The surface area of Samples 1 and 2, after calcination at 1000° C. for 5 hours, were 3 and 4, respectively.

TABLE

| Sample | Process | ZrO₂ (wt %) | Lattice Parameter (Å) | OSC 700° C. (μmol O₂/g) | OSC 1000° C. (μmol O₂g) |
|---|---|---|---|---|---|
| 1 | Spray Pyrolysis | 43 | 5.276 | 400 | 670 |
| 2 | Spray Pyrolysis | 43 | 5.276 | 410 | 650 |
| Comp. Example | Spray Dried, Then Calcined | 40 | 5.300 | 60 | 660 |

The lattice parameter in the Table above was determined by X-ray diffraction patterns. The lattice parameter indicates whether, and to what extent, the zirconium is mixed with cerium on the atomic level. A lower number indicates a more intimate mixture.

As shown by the lattice parameter figures in the Table above, the method of the present invention results in a more intimate mixing of the ceria and zirconia ions at the atomic level. See *Crystallography and Crystal Chemistry*, by F. Donald Bloss, pp. 485 through 487, incorporated herein by reference. As is also shown by the Table above, the OSC at up to 700° C. is dramatically higher for the powders of the present invention than those of the comparative example.

Although the present invention has been described in relation to particular embodiments thereof, many other variations and modifications and other uses will become apparent to those skilled in the art. Therefore, the present invention is to be limited not by the specific disclosure herein, but only by the appended claims.

What is claimed is:

1. A composition of matter comprising particles of zirconium oxide and cerium oxide, wherein zirconium oxide is about 7 to 80 weight percent of the composition and wherein, the particles have a surface area of 5 m²/g or less and oxygen storage capacities at about 700° C., in the range of about 300 μmol/g to about 500 μmol/g.

2. The composition of claim 1, wherein the weight percentage of zirconium oxide is in the range of about 25 to about 42.

3. The composition of claim 2, wherein said particles has a cubic crystalline structure.

4. The composition of claim 1 wherein the particles have a crystalline size of about 25 Å to about 400 Å.

5. The composition of claim 1 wherein the particles have a surface area of about 1 $m^2/g$ to about 5 $m^2/g$.

6. The composition of claim 1 wherein the oxygen storage capacity of the particles, at about 700° C., is about 400 $\mu$mol/g.

7. The composition of claim 1 wherein the particles are coated onto a substrate and have a catalytically-active noble metal deposited on the surface of the particles, wherein the substrate is ceramic or metal.

8. The composition of claim 1 wherein said particle has a tetragonal or cubic crystalline structure.

9. The composition of claim 1 wherein said particle has primarily a cubic crystalline structure.

* * * * *